Nov. 20, 1962     C. R. LAUBENFELS     3,064,483
ACCELEROMETER
Filed Oct. 24, 1958
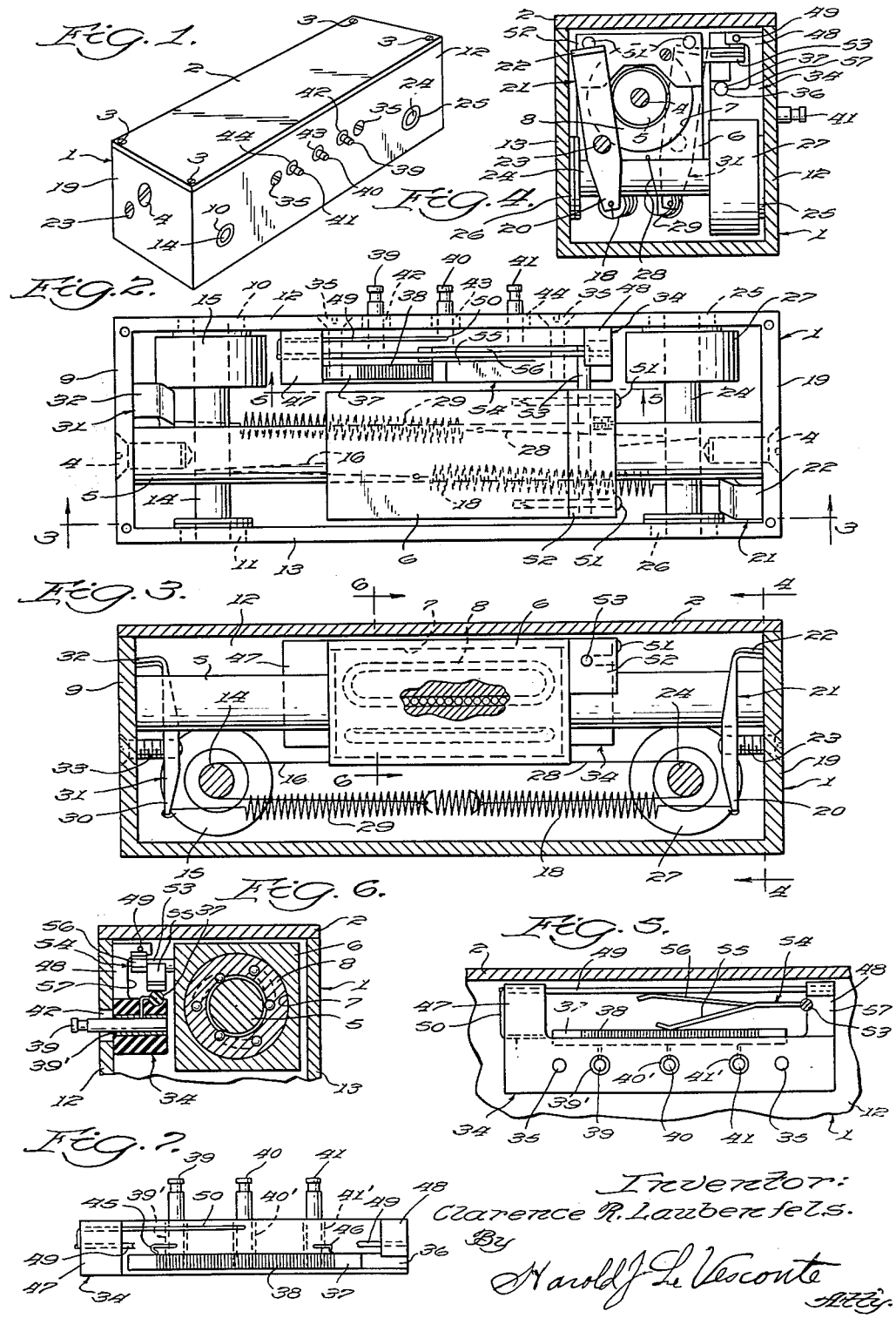
Inventor:
Clarence R. Laubenfels.
By
Harold L. Visconte
Atty.

United States Patent Office
3,064,483
Patented Nov. 20, 1962

3,064,483
ACCELEROMETER
Clarence R. Laubenfels, 142 La Plaza, Anaheim, Calif.
Filed Oct. 24, 1958, Ser. No. 769,379
5 Claims. (Cl. 73—514)

This invention relates to means for measuring the accelerated movements of mechanisms or of elements thereof and particularly those accelerated movements which are along a straight line, such devices being known as accelerometers.

The principal objects of the invention are to provide an improved accelerometer characterized by simplicity and sturdiness of construction, by small size to permit the use thereof in mechanisms where space is at a premium, by low natural frequency, by a high degree of accuracy in its response to imposed acceleration, especially in the region closely adjacent to the null or zero point of the instrument, by novel, substantially frictionless mounting means for the movement responsive component of the device, and by employment of opposed resilient means effective, when the instrument is in repose, to return the instrument accurately to a predetermined null or zero point having regard for the attitude of the instrument; all of said factors contributing to the sensitivity and the practical utility of the device.

With the foregoing principal objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a perspective view of the exterior of an accelerometer embodying the invention, FIG. 2 is an enlarged, top plan view with the cover of the case removed and the instrument turned end for end as compared with FIG. 1, FIG. 3 is a longitudinal sectional view taken on the line 3—3 of FIG. 2, FIG. 4 is a transverse sectional view taken on the line 4—4 of FIG. 3, FIG. 5 is a fragmentary, sectional elevational view of the potentiometer means, the view being taken on the line 5—5 of FIG. 2, FIG. 6 is a fragmentary transverse sectional view taken on the line 6—6 of FIG. 3, and FIG. 7 is a top plan view of a potentiometer coil and its mounting and electrical connections.

The illustrated embodiment of the invention comprises a metal case 1 of elongated rectangular configuration having an open side which is normally closed by a cover 2 detachably secured thereon by screws 3. Mounted within the case by screws 4, 4 and extending between the ends of the case is a guide member 5 comprising a cylindrical rod. A weight element 6 of less length than the guide member 5 is freely slidably mounted thereon, said weight element being provided with a bore 7 extending therethrough in which the outer face of a linear ball bearing assembly 8 is mounted. The linear ball bearing comprises cylindrical base element in which are mounted a plurality of endless tubes formed into elongated rings including runs which are parallel to the axis of the base element and of which one run of each ring is closer to the axial center line than the other. The said one run of each of the rings is partially cut away and the rings are filled with bearing balls which engage the guide member at radially spaced points and thus afford virtually frictionless movement of the member 6 and the bearing along the guide member 5. Ball bearing assemblies of the general character above described are standard articles of commerce and consequently further detailed description is believed to be unnecessary. It will be apparent that any other arrangement which will confine a weight element to linear movement with a minimum of frictional resistance may as well be employed as that above described and shown in the drawings.

The weight or linear inertia element 6 is resiliently restrained against movement at a null or zero point which, in the present embodiment, is approximately at the mid-point of its permissible range of travel along the guide member 5 by a pair of opposed, tensioned, separately actuated, resilient devices which also actuate rotatable weight means serving to add inertia with resultant lowering of the range of harmonic response of the element 6 to frequencies which are substantially below the vibrational frequencies to which the instrument may be exposed. Adjacent the end wall 9 thereof, the case 1 is provided with axially aligned ball bearings 10 and 11 mounted in the side walls 12 and 13 of the case which ball bearings support the opposite ends of a cross shaft 14, said cross shaft, adjacent the inner face of the wall 12 carrying a disc-like inertia member 15. A thin flexible member, such as a wire 16, has one end attached to the end of the inertia member 6 adjacent to the shaft 14 and thence extends around the shaft 14 and thence adjacent to and parallel with the bottom of the case toward the opposite end of the case, terminating at about the mid-length of the case in an attachment to one end of a spring 18 which extends from a point adjacent the opposite end 19 of the case, the other end of said spring being attached to the free end 20 of an adjusting lever arm 21 disposed adjacent to the side wall 13 and extending upwardly from the bottom of the case and terminating in a fulcrum portion 22 engaging the end wall 19 adjacent the top thereof. A screw 23 having the head thereof resting on the outer surface of the end wall 19 and having a body portion threadedly engaging the mid-length of the lever arm 21 serves to adjust the lever arm in opposition to the bias of the spring 18 and, as will be hereinafter explained, in opposition to the bias of a similar but oppositely disposed spring with resultant variation of the total tension exerted by both of the springs.

It will be observed that the force exerted by the bias of the spring 18 tends to move the weight element 6 to the left as viewed in FIGS. 2 and 3. This tendency is opposed by a second biasing means of the same general character comprising a shaft 24 journaled in bearings 25 and 26 carried, respectively, by the side walls 12 and 13 of the case and disposed adjacent to the end wall 19; said shaft also carrying a disk-like inertia element 27 which is preferably disposed adjacent the same side wall of the case as the corresponding element on the shaft 14. A flexible member 28 corresponding to the member 16 has one end thereof attached to the adjacent end of the inertia element 6 and thence extends around the shaft 24 and thence parallel to the bottom of the case toward the opposite end thereof and at about the mid-length of the case having its other end attached to one end of a tension spring 29. The other end of the tension spring 29 is attached to the lower end 30 of a second adjusting lever arm 31 which is similar to the arm 21 but is disposed adjacent to the side wall 12 and includes a fulcrum element 32 engaging the end wall 9. An adjusting screw 33 extending through the end wall 9 threadedly engages the lever arm 31 to move the lower end of the arm toward and away from the end wall with resultant variation of the tension on the spring 29 and consequently also on the spring 18. Thus, the tensioned devices serve additionally to impart the rotative movements to the inertia disks and, by reversing the direction of linear movement of portions of the flexible members, the cross shafts provide clearance space in which the tension springs associated with the flexible members are contained in a compact assembly. While single wires are shown having a turn around the cross shafts, it will be appreciated that, if desired, the said wires may be formed in separate portions each separately attached to the cross shaft where convenience in assembly or other considerations make such construction desirable.

It will be obvious that with both springs being of the same length and under equal tension and with the respective flexible members also being of the same length, the opposing forces of the two springs will normally hold the weight 6 at a mid-travel position. It will also be apparent that should either lever arm be changed by its adjusting screw, both springs will respond and continue to exert balancing tension forces on the member 6 these forces being of greater or lesser degree and the only effective change being a slight shifting of the place of repose or null point of the member 6 along the guide member 5. It should be mentioned at this point that as a matter of practice, it has been found desirable to employ springs which are tensioned to approximately half of their maximum allowed stress. The maximum allowable stress, which is attained at full displacement of the weight 6, should be less than the proportional limit of the spring material. Therefore, regardless of the extent to which the weight element is moved by reason of applied accelerations, it will return to exactly the same null or zero point as shall have been established by the adjustment of the lever arms. This characteristic of the instrument is called "repeatability."

From the foregoing description of the instrument, it will be obvious that if it is fixed to a piece of mechanism which is experiencing an acceleration in the direction of the axis of the guide member 5, the acceleration will cause the weight element to be relatively displaced along the guide member opposite the direction of such acceleration and to the extent permitted by the tension of the springs 18 and 29. This extent of movement from its null point is an indication of the extent of acceleration of the mechanism to which the instrument is attached and accordingly means must be provided whereby the extent of such movement is translated into measurable or recordable indicia. As shown in the illustrated embodiment of the invention, this translation is achieved through electrical means comprising a potentiometer and a brush element moved along the resistance element thereof by the displacement of the inertia element of the device.

The illustrated potentiometer means comprises a base 34 formed of non-conductive material of generally rectangular, elongated, cross-section secured to the inner face of the side wall 12 of the case by screws 35, 35; said base on its upper surface having a groove 36 formed therein in which there is secured a rod 37 preferably formed of non-conductive material and having a winding 38 thereon. In the illustrated embodiment of the invention, this winding consists of very fine wire of such size that the wire has approximately 1000 turns on the rod per linear inch. Mounted in the potentiometer base 34 is a series of three terminals 39, 40 and 41 protruding through openings 42, 43 and 44 formed in the side wall 12 of the case and tightly engaging, respectively, metal sleeves 39', 40', and 41' carried by the base 34. The sleeve 39' is connected by a lead 45 to one end of the coil 38 and the sleeve 41' is connected by a lead 46 to the opposite end of the coil. The potentiometer base 34 is further provided at each end thereof with upstanding arm or lug members 47 and 48. Supported by and extending between said members is a conductive bus or trolley bar element 49 which extends parallel to the potentiometer winding 38. A lead 50 extends from the sleeve 40' along the upper face of the potentiometer base through the portion 47 thereof and thence upwardly to the connection with the bus bar 49. Secured to one end of the member 6 by pins 51 is a brush holding element 52 formed of non-conductive material carrying a transversely extending pin 53 pivoted therein which extends beyond the side of the weight element facing the wall 12 of the case; said extending end of the pin 53 carrying a thin sheet metal brush element 54 having a pair of opposed parallel spring fingers 55 and 56 which, respectively, engage the coils of the potentiometer winding and the bus bar 49. The lug member 48 is cut away as at 57 to afford clearance for the brush element when the induced movement of the member 6 is to the right as viewed in FIG. 2. It is particularly to be observed that in this novel construction, there are no wires or other conductors which are attached to any moving part. The movement of the brush element deriving from the movement of the member 6 forms a connection between the bus bar 49 and the coils of the potentiometer winding 38 thus varying the resistance to the current flowing between the terminals 39 and 41 and the terminal 40.

It will be apparent that as the member 6 is displaced by the acceleration of the case and mechanism to which the case is attached, the voltage of the current flowing through the potentiometer will be varied and that this variation is linear in character, wherefore, changes in the value thereof can be readily translated by the response of suitable instruments used in connection therewith into terms of the acceleration values derived therefrom.

An accelerometer performs according to the well known physical law, $F=Ma$, Force equals Mass times acceleration. When the body of the accelerometer is accelerated in the principal direction, the mass or relatively movable element of the instrument tends to stand still in space due to its insertia. The spring or springs holding it in its normal position are deformed and exert a force which is equal to the Mass times the acceleration. Linear springs, i.e., springs in which deformation is proportional to force, will be deformed in proportion to the force. If the deformation of the springs, i.e., the relative displacement between the weight and the structure can be measured with some degree of accuracy, the force or acceleration can be known to that degree of accuracy.

If the structure upon which the accelerometer it mounted is subject to vibration, the accelerometer may experience or "see" acceleration due to the vibration as well as the principal acceleration which is to be measured unless the accelerometer is designed to be sensitive only within some predetermined range of frequencies. Generally, these vibrations are of relatively high frequency compared to the principal acceleration. Therefore, in many cases, the vibration can be prevented from affecting the accelerometer reading by designing the accelerometer so as to respond only to frequencies much lower than the vibration frequencies. Vibration frequencies in mechanisms frequently are in the range of from, say, 50 to several thousand cycles per second (c.p.s.) but sometimes are lower. An accelerometer with a natural frequency of 10 c.p.s. will not respond to these higher frequencies. However, it is difficult to make an accelerometer with a natural frequency of 10 c.p.s. as will be seen from the following equation:

$$(1) \quad f=\frac{1}{2\pi}\sqrt{\frac{g}{\delta_{st}}}=\sqrt{\frac{386.4}{2\pi}}\sqrt{\frac{1}{\delta_{st}}}=3.127\sqrt{\frac{1}{\delta_{st}}}$$

In which $f$ is the frequency in c.p.s. $\delta_{st}$ is a displacement of the weight caused by one $g$ acting upon it, one $g$ being the acceleration due to the earth's gravitational field and approximately 32.2 ft./sec.$^2$ or 386.4 in./sec.$^2$ Using the above equation, we can see that $$(2) \quad \delta_{st}=\frac{(3.127)^2}{f^2}=\frac{9.778}{f^2}$$

and for a desired frequency of 10 c.p.s.

$$(2a) \quad \delta_{st}=\frac{9.778}{100}=.09778=\text{approx. .1 in.}$$

Such an accelerometer would thus have a weight movement of .1 in. for each g impressed upon it. If the instrument was desired to measure accelerations of the order of, say, 50 g's in opposite directions, the total movement would be 100 times .1 or 10" inches. The weight would thus require room to move approximately 5 inches in either direction from its neutral position. This would result in a rather large instrument for which space would sometimes not be available.

This invention teaches a way of making an accelerometer which can have a frequency of 10 c.p.s. or lower without the relatively large displacement of the weight. In the form illustrated, the weight acts upon the positioning springs through flexible members or cables which actuate shafts with resultant reversal of the direction of movement of the portions of the flexible members which are attached to the respective springs. Accordingly, as previously pointed out, these springs can be placed in a position which is parallel to the weight or acceleration responsive element with a resultant saving in space and resultant achievement of the compactness in the instrument. Additionally, a reasonably long spring can be employed so that the possibility of distortion of the spring rate is nullified.

The cross shafts carry disks of heavy metal disposed a relatively large distance from the rotational axis of the shafts. These disks have relatively high inertia yet, being confined to turn only with the shaft about the shaft axis, they do not contribute to the force experienced by the springs and the weight or acceleration responsive element. The force deforming the springs is still only the mass of the weight times the acceleration. However, the inertia of the disks adds to the inertia of the weight in reducing the frequency as will be seen from the following equation which now refers to the weight, the two disks and the two springs.

(3) $$f = \frac{1}{2\pi}\sqrt{\frac{T}{\theta}\frac{1}{J}} = .1591\sqrt{\frac{T}{\theta}\frac{1}{J}}$$

in which $f$ is the frequency in c.p.s. as before, T is the torque and, $T = Wr$ where W is the weight in pounds and $r$ is the radius of the axle in inches where contacted by the flexible member, $\theta$ is the angular motion of the axle in radians for one g acceleration, J is the moment of the inertia of the combination of weight and the two inertial disks about the axis of rotation. Here (3a) $$J = \frac{W}{g}r^2 + \frac{D}{g}k^2$$

in which W=weight in pounds, $r$ radius of axle in inches at the point of engagement by the flexible member, $g$ is acceleration due to the earth's gravity (386.4 in./sec) D is the weight of the two inertial disks in pounds and k is the radius of gyration of the inertial discs in inches. It will be seen that since J is the denominator of the second half of Equation 3 above, an increase in J will lower the frequency.

A second advantage results from the structure herein disclosed. Since no instrument can be made which is completely free from friction, it is desirable to have a relatively large torque so that the frictional torque will be a small percent of the total torque (i.e., the total force affecting the springs). Friction results in hysteresis, that is, it causes a difference in output when the weight moves in one direction and then returns to the same position and this loss must be kept to the minimum percent possible. Since T is the numerator of the fraction in Equation 3, the greater T is, the higher the frequency. Therefore, the use of the inertial disks makes it possible to use a relatively large torque (i.e., a relatively large weight with resulting large force) and still achieve a relatively low frequency.

Testing engineers are familiar with the fact that in testing materials to determine their mechanical qualities (tension, compression and shear tests, for example) the plotted results start off with a straight line portion but the line does not go to zero stress at zero deformation. This is because of the difficulty in fastening the specimen into the test equipment with sufficient rigidity. The specimen moves slightly and "sets itself" relative to the equipment. This fact results in a condition which can not be tolerated in an accurate accelerometer, especially one which must measure both plus and minue accelerations. As the acceleration changes from plus to minus or vice versa, there would then appear twice the "lost motion" effect and the output reading would not be "repeatable" in its zero region (commonly called "null position"). To avoid this phenomena, the illustrated embodiment of the invention utilizes two opposed springs of equal rate which are under tension at all times. In an accelerometer having equal plus or minus extents of movement from the null or zero position, the springs will exert equal tension at the zero g or "null" position. As the weight moves in response to an imposed acceleration, the tension from one spring will increase and the tension of the other spring will decrease. At full deflection one spring will still have minimum tension (approximately 10–20% of maximum) and the other will have maximum tension. Neither spring will ever approach zero tension where the "lost motion" appears. If the acceleration is to have only a plug g range, two springs of unequal rate would be used so that the weaker spring would maintain tension in the zero or "null" position, and still maintain the desired approximately 10–20% of its maximum tension in the full range position of the weight or element.

While in the foregoing specification there has been described a presently preferred embodiment of the invention, it will be understood that such disclosure is by way of example, and it will be understood that the invention includes as well, all such modifications and changes in the parts, and in the construction, combination and arrangement of parts as shall come within the purview of the appended claims.

I claim:
1. In an instrument for measuring acceleration, a frame structure, an acceleration responsive element freely mounted on said frame structure and confined to movement in a right line path thereon, adjustable means for normally, yieldingly holding said element in a desired position intermediate the ends of said path comprising a first tensioned, resilient device extending between one end of said element and said frame structure and including a shaft journalled in said frame structure effective by rotation thereof derived from movement of said element to cause a component of said first resilient device to move in a direction opposite the coincident movement of said element, and a second tensioned resilient device extending between the opposite end of said element and a point on said frame structure opposite the point of attachment of said first resilient device thereto and including a second cross shaft journalled in said frame structure and effective by rotation thereof derived from movement of said element to correspondingly reverse the direction of movement of a component of said second resilient device, a pair of identical, cylindrical, inertia adding devices connected one each by each of said resilient devices for rotation by acceleration responsive movement of said element; along said path and effective to lower the range of harmonic response of said element to frequencies substantially below the vibrational frequencies to which said element may be exposed in use according to the formula

$$J = \frac{W}{g}r^2 + \frac{D}{g}k^2$$

where

J = the combined moment of inertia of the acceleration responsive element and the cylindrical, inertia adding devices, W = the weight in pounds of the acceleration responsive element, g = the acceleration due to gravity of the earth 386.4 in./sec.²,
r = the radius of the cross shafts in inches,
D = the weight in pounds of the two cylindrical devices,
K = the radius of gyration of the two cylindrical devices in inches;

and means actuated by acceleration responsive movement of said element relative to said frame structure for electrically signalling the magnitude and direction of an acceleration to which said element has responded.

2. In an instrument for measuring acceleration, a frame structure, an acceleration responsive element freely mounted on said frame structure and confined to movement in a right line path thereon, adjustable means for normally, yieldingly holding said element in a desired position intermediate the ends of said path comprising a first tensioned resilient device extending between one end of said element and said frame structure and including a shaft journalled in said frame structure effective by rotation thereof derived by movement of said element to cause a component of said first resilient device to move in a direction opposite the coincident movement of said element, and a second tensioned, resilient device extending between the opposite end of said element and a point on said frame structure opposite the point of attachment of said first resilient device thereto and including a second cross shaft journalled in said frame structure and effective by rotation thereof derived from movement of said element to correspondingly reverse the direction of movement of a component of said second resilient device, inertia adding means comprising a pair of cylindrical elements of substantially greater diameter than said shafts fixed in co-axial relation one each to each of said cross shafts for rotation therewith incident to direction reversing movements of said shafts, said cylindrical elements being effective to lower the range of harmonic response of said acceleration responsive element substantially according to the formula $$J = \frac{W}{g}r^2 + \frac{D}{g}k^2$$

where

J = the combined moment of inertia of the acceleration responsive element and the cylindrical, inertia adding devices,
W = the weight in pounds of the acceleration responsive element,
g = the acceleration due to gravity of the earth 386.4 in./sec.²,
r = the radius of the cross shafts in inches,
D = the weight in pounds of the two cylindrical devices
K = the radius of gyration of the two cylindrical devices in inches, and means on said frame structure and actuated by acceleration responsive movement of said element along said path, and other means effective by movement of said element relative to said frame structure to electrically indicate the magnitude and direction of an acceleration to which said element has responded.

3. In an instrument for measuring acceleration, a frame structure, an acceleration responsive element freely mounted on said frame structure and confined to a right line path of movement thereon, means for normally, yieldingly holding said element in a desired position intermediate the limits of movement of said element in said path and comprising a pair of shafts journalled in said frame structure and disposed at right angles to said path of travel of said element and adjacent the opposite ends of said frame structure, and a pair of similar, but opposing, tensioned, resilient devices associated one each with each of said cross shafts, one of said devices comprising flexible member means extending between one end of said element and the one of said cross shafts adjacent to said one end of said element, and other flexible shafts and one end of a tension spring; the other end of member means extending between said one of said cross said tension spring being attached to a tension regulating means mounted on the end of said frame structure remote from said one cross shaft, and the other of said tensioned, resilient devices comprising a second flexible member means extending between the opposite end of said element and the other of said cross shafts and other flexible member means extending between said other cross shaft and one end of a second tension spring; the other end of said second tension spring being attached to a second tension regulating means attached to the end of said frame structure remote from said other cross shaft and the interengagement between said flexible member means and each of said cross shafts being effective to produce rotative movement of said cross shafts incident to movement of said element in opposition to the bias of one or the other of said tension springs, a pair of inertia adding means carried one each by each of said cross shafts for movement therewith, and means carried by said frame structure and actuated by movement of said element effective to indicate both the magnitude and the direction of an acceleration to which said element has responded; said cross shafts serving to increase the extent of rotational movement of said inertia adding means, and to reverse the direction of movement of the ends of the flexible members remote from said element with resultant compact arrangement of said springs and said element on said frame.

4. In an instrument for measuring acceleration, a frame structure, an acceleration responsive element freely mounted on said frame structure and confined to a right line path of movement thereon, adjustable means for normally, yieldingly holding said element in a desired position intermediate the limits of movement of said element in said path and comprising a pair of shafts journalled in said frame structure and disposed at right angles to said path of movement of said element and adjacent the opposite ends of said frame structure, and a pair of similar, but opposing tensioned, resilient devices associated one each with each of said cross shafts; one of said devices comprising flexible member means extending between one end of said element and the one of said cross shafts adjacent to said one end of said element, and other flexible member means extending between said one of said cross shafts and one end of a tension spring; the other end of said tension spring being attached to a manually operable tension regulating means mounted on the end of said frame structure remote from said one cross shaft, and the other of said tensioned, resilient devices comprising a second flexible member means extending between the opposite end of said element with the other of said cross shafts and other flexible member means extending between said other cross shaft and one end of a second tension spring; the other end of said second tensioned spring being attached to a second manually operable tension regulating means mounted on the end of said frame structure remote from said other cross shaft; the connections between said flexible member means and each of said cross shafts being effective to produce rotative movement of said cross shafts incident to movement of said element in opposition to the bias of one or the other of said tension springs, means comprising a pair of cylindrical, inertia producing elements fixed one each in co-axial relation to each of said shafts, effective to lower the range of harmonic response of said element to frequencies which are substantially below the vibrational frequencies to which said element may be exposed in use according to the formula $$J = \frac{W}{g}r^2 + \frac{D}{g}k^2$$

where

J = the combined moment of inertia of the acceleration responsive element and the cylindrical, inertia adding devices, $W$ = the weight in pounds of the acceleration responsive element, $g$ = the acceleration due to gravity of the earth 386.4 in./sec.$^2$, $r$ = the radius of the cross shafts in inches, $D$ = the weight in pounds of the two cylindrical devices, $K$ = the radius of gyration of the two cylindrical devices in inches, and means actuated by relative movement between said element and said frame structure effective to indicate the direction and magnitude of an acceleration causing the said relative movement.

5. In an instrument for measuring acceleration, a frame structure including an elongated case having a removable cover; said frame structure also including an elongated guiding member disposed within said case and being spaced from all side walls thereof, an acceleration responsive element mounted on said member for acceleration responsive movement longitudinally thereof in either direction, means for normally, yieldingly holding said element in a desired position intermediate the limits of its permissible extent of movement along said member comprising a pair of similar, but opposing tensioned, resilient devices each having a portion thereof attached to said element for movement therewith and another portion thereof fixed to relatively immovable means carried by said frame structure; each of said tensioned, resilient devices including an adjusting means operable from the exterior of said case both to effect variation of the desired normal predetermined position of said element on said member and the minimum acceleration to which the element will respond by said movement from said desired position along said member, a pair of inertia adding means connected one each by each of said devices to said element for actuation by said element effective to lower the range of harmonic response of said element to frequencies which are substantially below the vibrational frequencies to which said element may be exposed in use, and means actuated by movement of said element on said member effective to indicate the direction and magnitude of an acceleration causing such relative movement, said tensioned, resilient devices comprising a first tensioned, resilient device extending between one end of said element and said frame structure and including a first cross shaft journalled in said frame structure effective by rotation thereof derived from movement of said element to reverse the direction of movement of a component of said first resilient device, and a second tensioned, resilient device extending between the opposite end of said element and a point on said frame structure opposite the point of attachment of said first resilient device thereto and including a second cross shaft journalled in said frame structure and effective by rotation thereof derived from movement of said element to reverse the direction of movement of a component of said second resilient device and said inertia adding means comprising cylindrical elements fixed in co-axial relation to each of said shafts for rotation therewith incident to rotative movements thereof; said cross shafts serving to increase the extent of rotational movement of said inertia adding means, and to reverse the direction of movement of the ends of the flexible members remote from said element with resultant compact arrangement of said springs and said element on said frame.

References Cited in the file of this patent

UNITED STATES PATENTS

| | | |
|---|---|---|
| 2,139,694 | Reid et al. | Dec. 13, 1938 |
| 2,583,202 | Benson | Jan. 22, 1952 |
| 2,641,457 | Carleton | June 9, 1953 |
| 2,706,401 | Spaulding | Apr. 19, 1955 |
| 2,726,075 | Hosford | Dec. 6, 1955 |
| 2,733,116 | Fanthan et al. | Jan. 31, 1956 |
| 2,752,466 | Bonnell | June 26, 1956 |
| 2,797,911 | Montgomery | July 2, 1957 |
| 2,831,670 | Bourns et al. | Apr. 22, 1958 |
| 2,839,922 | Manildi | June 24, 1958 |

FOREIGN PATENTS

| | | |
|---|---|---|
| 884,137 | France | Apr. 12, 1943 |
| 1,060,073 | France | Nov. 18, 1953 |